(12) United States Patent
Leese

(10) Patent No.: US 9,051,056 B2
(45) Date of Patent: Jun. 9, 2015

(54) FUEL HEAT MANAGEMENT SYSTEM

(75) Inventor: Robert E. Leese, Derby (GB)

(73) Assignee: ROLLS-ROYCE plc, London (GB)

( * ) Notice: Subject to any disclaimer, the term of this patent is extended or adjusted under 35 U.S.C. 154(b) by 1131 days.

(21) Appl. No.: 13/038,874

(22) Filed: Mar. 2, 2011

(65) Prior Publication Data

US 2011/0232293 A1   Sep. 29, 2011

(30) Foreign Application Priority Data

Mar. 24, 2010 (GB) .................................. 1004863.5

(51) Int. Cl.
| | |
|---|---|
| F02K 3/115 | (2006.01) |
| B64D 37/34 | (2006.01) |
| F02C 7/18 | (2006.01) |
| F02C 7/224 | (2006.01) |
| F02K 3/105 | (2006.01) |
| F02C 7/14 | (2006.01) |
| F28D 21/00 | (2006.01) |

(52) U.S. Cl.
CPC ................. *B64D 37/34* (2013.01); *F02C 7/185* (2013.01); *F02C 7/224* (2013.01); *F02K 3/105* (2013.01); *F28D 2021/0026* (2013.01); *F02K 3/115* (2013.01); *F02C 7/14* (2013.01); *Y02T 50/671* (2013.01); *Y02T 50/675* (2013.01)

(58) Field of Classification Search
CPC .................. F01D 25/18; F28D 1/0233; F28D 2021/0026; F02K 9/64; F02K 3/105; F02K 3/115; F02C 7/224; F02C 7/185; F02C 7/18; F05B 2260/20

USPC .......... 60/204, 39.08, 206, 226.1, 226.3, 243, 60/248, 262, 266, 267, 772, 730, 39.281, 60/736, 39.83; 165/41, 51, 52; 184/6.22

See application file for complete search history.

(56) References Cited

U.S. PATENT DOCUMENTS

| | | | | |
|---|---|---|---|---|
| 3,080,716 | A | * | 3/1963 | Cummings et al. ............. 60/736 |
| 3,300,965 | A | * | 1/1967 | Sherlaw et al. .............. 60/39.08 |
| 4,041,697 | A | * | 8/1977 | Coffinberry et al. ........ 60/39.281 |
| 4,151,710 | A | * | 5/1979 | Griffin et al. ................ 60/39.08 |
| 4,505,124 | A | * | 3/1985 | Mayer ............................. 62/180 |
| 4,620,588 | A | * | 11/1986 | Pfouts et al. ................... 165/289 |
| 4,696,156 | A | * | 9/1987 | Burr et al. .................... 60/39.08 |
| 4,741,152 | A | * | 5/1988 | Burr et al. ....................... 60/772 |
| 4,759,401 | A | * | 7/1988 | Pfouts et al. .................... 165/51 |

(Continued)

OTHER PUBLICATIONS

British Search Report issued in British Application No. GB1004863.5 on Jun. 14, 2010.

*Primary Examiner* — Phutthiwat Wongwian
*Assistant Examiner* — Michael B Mantyla
(74) *Attorney, Agent, or Firm* — Oliff PLC

(57) ABSTRACT

A fuel heat management system including a fuel line for conveying fuel, and a fuel/oil heat exchanger which receives fuel flowing through the fuel line. The fuel heat management system further comprises an oil line for circulating oil from an engine oil system to the fuel/oil heat exchanger and back to the engine oil system. The fuel/oil heat exchanger brings the oil and the fuel into heat exchange relationship. The fuel heat management system further includes an air/oil heat exchanger which receives oil flowing through the oil line, the air/oil heat exchanger bringing the oil and air into heat exchange relationship. The fuel heat management system further includes an air/fuel heat exchanger which receives fuel flowing through the fuel line, the air/fuel heat exchanger bringing the fuel and air into heat exchange relationship.

10 Claims, 3 Drawing Sheets

(56) References Cited

U.S. PATENT DOCUMENTS

| | | | |
|---|---|---|---|
| 5,121,598 A * | 6/1992 | Butler | 60/39.08 |
| 5,553,449 A * | 9/1996 | Rodgers et al. | 60/204 |
| 5,615,547 A | 4/1997 | Beutin et al. | |
| 6,182,435 B1 * | 2/2001 | Niggemann et al. | 60/772 |
| 6,415,595 B1 * | 7/2002 | Wilmot et al. | 60/785 |
| 6,584,778 B1 * | 7/2003 | Griffiths et al. | 60/782 |
| 7,013,636 B2 * | 3/2006 | Iya et al. | 60/204 |
| 7,213,391 B2 * | 5/2007 | Jones | 60/226.1 |
| 7,478,525 B2 * | 1/2009 | Iya et al. | 60/204 |
| 7,509,793 B2 * | 3/2009 | Tumelty et al. | 60/39.08 |
| 7,861,512 B2 * | 1/2011 | Olver et al. | 60/226.1 |
| 7,908,840 B2 * | 3/2011 | Schwarz et al. | 60/39.08 |
| 8,205,427 B2 * | 6/2012 | Schwarz et al. | 60/39.08 |
| 8,516,792 B2 * | 8/2013 | Bulin | 60/266 |
| 2005/0155353 A1 * | 7/2005 | Sabatino et al. | 60/772 |
| 2007/0264133 A1 * | 11/2007 | Schwarz et al. | 417/110 |
| 2009/0313999 A1 * | 12/2009 | Hunter et al. | 60/772 |
| 2010/0154427 A1 * | 6/2010 | Logan | 60/772 |

* cited by examiner

Fig.2

110 degC limit at HMU
- - - - - - - - - - - - -

105 degC prediction
_____

No particular limit for idle descent other than basic fuel stability limit of 150 degC

— 14
— 10

108 degC prediction

←— Cruise —→ ←— Idle —→

Fig.3

110 degC limit at HMU
- - - - - - - - - - - - -

105 degC prediction
_____

— 14
— 10

108 degC prediction 101 degC new limit for part-staged combustion
- - - - - - - - - - - - -

←— Cruise —→ ←— Idle —→

Fig.5

110 degC limit at HMU
- - - - - - - - - - - - -

109 degC prediction
_____

101 degC new limit for part-staged combustion 96 degC prediction
- - - - - - - - - - - - -

←— Cruise —→ ←— Idle —→

FUEL HEAT MANAGEMENT SYSTEM

The present invention relates to a fuel heat management system which can control the temperature of fuel supplied to an engine.

During aircraft operation, fuel is withdrawn from fuel tanks located on the aircraft. Before being conveyed to an engine, the fuel is passed through a fuel filter to remove any solid contaminants from the fuel. However, when the aircraft is at high altitude, the temperature of the fuel in the fuel tanks can be below the freezing point of water. This can lead to the formation of ice in the fuel, which can block the fuel filter.

Thus it is usual to increase the temperature of the fuel by using hot engine oil as a source of heat. Aircraft engines typically have oil systems in which oil is used to lubricate and cool electrical generators, bearings and gears in the transmission system of the engine. A large amount of heat is therefore transferred to the oil of the oil system during the operation of the engine. A fuel/oil heat exchanger included in the engine exchanges heat between the hot oil and the cold fuel, and warming the fuel to a temperature above the freezing point of water. Such a system has the additional benefits of cooling the oil, thereby maintaining its performance, and ensuring that some of the heat transferred to the oil during the operation of the engine is not wasted, thereby increasing the efficiency of the engine.

When the flow-rate of the fuel in the engine is low, for example when the engine becomes idle during the transition phase from cruising to descending, it is desirable to reduce the flow of oil heat to the fuel line. This prevents the relatively slowly flowing fuel from overheating. In particular, it is desirable to limit the temperature of the fuel to less than the temperature at which the fuel becomes unstable. It is known that the flow of oil heat to the fuel line can be reduced through the use of one or more surface-air/oil heat exchangers. In such a heat exchanger, the hot oil exchanges heat with cold air passing through e.g. a fan bypass duct of the engine. This dissipates heat from the oil system to the fan air and reduces the heat transferred to the fuel.

FIG. 1 shows schematically a conventional configuration for a fuel heat management system 1 of a gas turbine engine. The fuel heat management system has a fuel line 2 which conveys fuel from a low pressure pump to engine burners. A fuel/oil heat exchanger 3 receives fuel flowing through the fuel line. An oil line 4 circulates oil from an engine oil system 5 to the fuel/oil heat exchanger and back to the engine oil system, such that the fuel/oil heat exchanger brings the oil and the fuel into heat exchange relationship.

Two surface air/oil heat exchangers 6 are arranged in parallel around a section of the oil line 4 containing an oil bypass valve 7. The air/oil heat exchangers are positioned in fan air streams 8, 9 which provide cold air to the air/oil heat exchangers. The oil bypass valve allows the surface-air/oil heat exchangers to be bypassed by some of the oil at those engine operation conditions which do not require a reduction in the flow of oil heat to the fuel line.

Despite the surface-air/oil heat exchangers 6, when the fuel flow-rate reduces significantly at the end of a cruise phase of an aircraft flight cycle, the thermal inertia of the oil in the oil system 5 can nonetheless cause a rapid transient rise in the temperature of the fuel leaving the fuel/oil heat exchanger 3.

FIG. 2 is a schematic plot showing the transient fuel temperature rise 10 predicted at the end of a cruise phase of an aircraft flight cycle when the fuel heat management system shown schematically in FIG. 1 is used in an engine with a conventional combustion system. During the cruise phase of the engine, the fuel temperature is maintained at a constant 105 degrees centigrade. This is below the maximum temperature limit of 110 degrees centigrade allowed in the engine fuel system during the cruising phase. For example, the engine fuel system may have a hydro-mechanical unit (HMU) which measures the flow rate of fuel to engine burners, and which for correct operation during the cruising phase requires the fuel to be below a certain temperature. At the transition between the cruise phase of the engine and the idle descent phase, the fuel temperature rapidly increases to a peak 14, before falling again to a value of 108 degrees centigrade. With a conventional combustion system, this peak may not be a problem as the only fuel temperature limit applied during the idle descent phase is the fuel stability temperature, which is approximately 150 degrees centigrade.

However, recent engine developments, such as the introduction of lean burn combustion systems, can also require a maximum fuel temperature in the engine fuel supply system during the idle, low fuel flow-rate phase of the engine. Indeed, this idle phase maximum temperature limit may be less than the maximum fuel temperature allowed during the cruising phase.

Accordingly, an object of the present invention is to improve the control of the temperature of fuel in a fuel line of a gas turbine engine. In particular, an object of the present invention is to reduce the temperature of fuel during an idle, low fuel flow-rate phase of the engine to a lower temperature than can be achieved with known fuel heat management systems, while maintaining higher fuel temperatures during a cruising, higher fuel flow-rate phase of the engine.

A first aspect of the present invention provides a fuel heat management system comprising:

a fuel line for conveying fuel, a fuel/oil heat exchanger which receives fuel flowing through the fuel line, an oil line for circulating oil from an engine oil system to the fuel/oil heat exchanger and back to the engine oil system, such that the fuel/oil heat exchanger brings the oil and the fuel into heat exchange relationship, and an air/oil heat exchanger which receives oil flowing through the oil line, the air/oil heat exchanger bringing the oil and air into heat exchange relationship, wherein:

the fuel heat management system further comprises an air/fuel heat exchanger which receives fuel flowing through the fuel line, the air/fuel heat exchanger bringing the fuel and air into heat exchange relationship.

Relative to the known fuel heat management system shown schematically in FIG. 1, the fuel heat management system of this aspect of the invention has an air/fuel heat exchanger in the fuel line. The air/fuel heat exchanger can transfer heat directly from the fuel to air.

Thus when the flow-rate of fuel in the engine is low, the fuel temperature downstream of the air/fuel heat exchanger can be controlled by heat dissipation at the air/fuel heat exchanger. The system can therefore reduce the temperature of the fuel during an idle, low fuel flow-rate phase of the engine. In particular, the system can reduce or eliminate a peak in the fuel temperature at the transition between e.g. a cruising, higher fuel flow-rate phase of the engine and the idle phase. That is, a hot fuel "slug" can be prevented from passing through the air/fuel heat exchanger. On the other hand, when the flow-rate of the fuel is higher, the temperature drop of the fuel across the air/fuel heat exchanger may become less significant. The system can therefore maintain higher fuel temperatures during the cruising, higher fuel flow-rate phase of the engine.

The fuel heat management system of this aspect of the invention may have any or, to the extent that they are compatible, any combination of the following optional features.

The fuel heat management system may have a single air/oil heat exchanger and a single air/fuel heat exchanger. The total number of heat exchangers which dissipate heat to air is then the same as in the known fuel heat management system shown schematically in FIG. 1. However, the combined size and/or weight of the heat exchangers which dissipate heat to air may be reduced relative to the known heat management system because of the increased effectiveness of the air/fuel heat exchanger at cooling fuel at low fuel flow-rates, as compared to an air/oil heat exchanger.

On the other hand, with a single air/oil heat exchanger, the amount of oil heat dissipated to air may be reduced relative to the known fuel heat management system. To compensate for this during e.g. take-off, it may therefore be necessary to have a larger fuel/oil heat exchanger than the known fuel heat management system, so that more oil heat is transferred to the fuel. Nonetheless, the changes in size of the heat exchangers may result in a fuel heat management system which, if not smaller and lighter, is about the same size and weight as the known fuel heat management system.

Preferably, the fuel heat management system has a bypass fuel line having a pressure relief valve which can cause fuel flowing through the fuel line to bypass the air/fuel heat exchanger. The bypass fuel line may reduce the risk of fuel damaging and escaping from the air/fuel heat exchanger at high fuel pressures. The bypass fuel line can also reduce the fuel flow through the air/fuel heat exchanger if a higher fuel temperature is required.

Advantageously, the fuel heat management system has a bypass oil line having an oil bypass valve which can cause oil flowing through the oil line to bypass the air/oil heat exchanger. The bypass oil line allows some oil to bypass the air/oil heat exchanger at engine operation conditions which do not require a reduction in the flow of oil heat to the fuel line.

The air/fuel heat exchanger is typically downstream on the fuel line from the fuel/oil heat exchanger. Thus the air/fuel heat exchanger can directly cool the fuel leaving the fuel/oil heat exchanger. The fuel temperature downstream of the fuel/oil heat exchanger before passage through the air/fuel heat exchanger may still exhibit the transient increase in temperature during the transition to the idle phase of the engine. However, if there are no temperature sensitive engine components (such as an HMU) on the fuel line between the fuel/oil heat exchanger and the air/fuel heat exchanger, then this temporary increase (which can be removed by the air/fuel heat exchanger) may be acceptable.

Typically, the air/oil heat exchanger is upstream on the oil line from the fuel/oil heat exchanger. Thus, the temperature of the oil can be controlled before the oil passes through the fuel/oil heat exchanger and into heat exchange relationship with the fuel.

Advantageously, the air/fuel heat exchanger can be located in an air flow passage of a gas turbine engine. Heat from the fuel can then be dissipated at the air/fuel heat exchanger into air flow through the passage. The air flow can maintain a high rate of heat dissipation at the air/fuel heat exchanger into the air. Advantageously, the air/oil heat exchanger can similarly be located in an air flow passage of a gas turbine engine.

The gas turbine engine may be a turbofan gas turbine engine, and the air flow passage may be a fan bypass duct of the turbofan engine. A constant stream of cold fan air through the fan bypass duct may then be present at the air/fuel and/or air/oil heat exchanger.

A second aspect of the present invention provides a gas turbine engine having a fuel heat management system of the first aspect.

A third aspect of the present invention provides a method of operating a gas turbine engine according to the second aspect, the method comprising:

running the engine at a cruise operating condition, and changing the engine to an idle operating condition;

wherein, on changing from the cruise operating condition to the idle operating condition, the temperature of the fuel exiting the fuel heat management system along the fuel line decreases to a lower level.

Preferably, on changing from the cruise operating condition to the idle operating condition, the temperature of the fuel exiting the fuel heat management system along the fuel line decreases to a lower level without any transient increase in temperature.

Embodiments of the invention will now be described by way of example with reference to the accompanying drawings in which:

FIG. 2 shows a schematic plot of the predicted temperature variation of fuel exiting the conventional fuel heat management system of FIG. 1 during the is transition period from a cruising phase of the engine to an idle descent phase;

FIG. 3 shows the plot of FIG. 2 but superimposed with a maximum allowable temperature limit in the idle phase for a lean burn combustion system;

Figure 4:
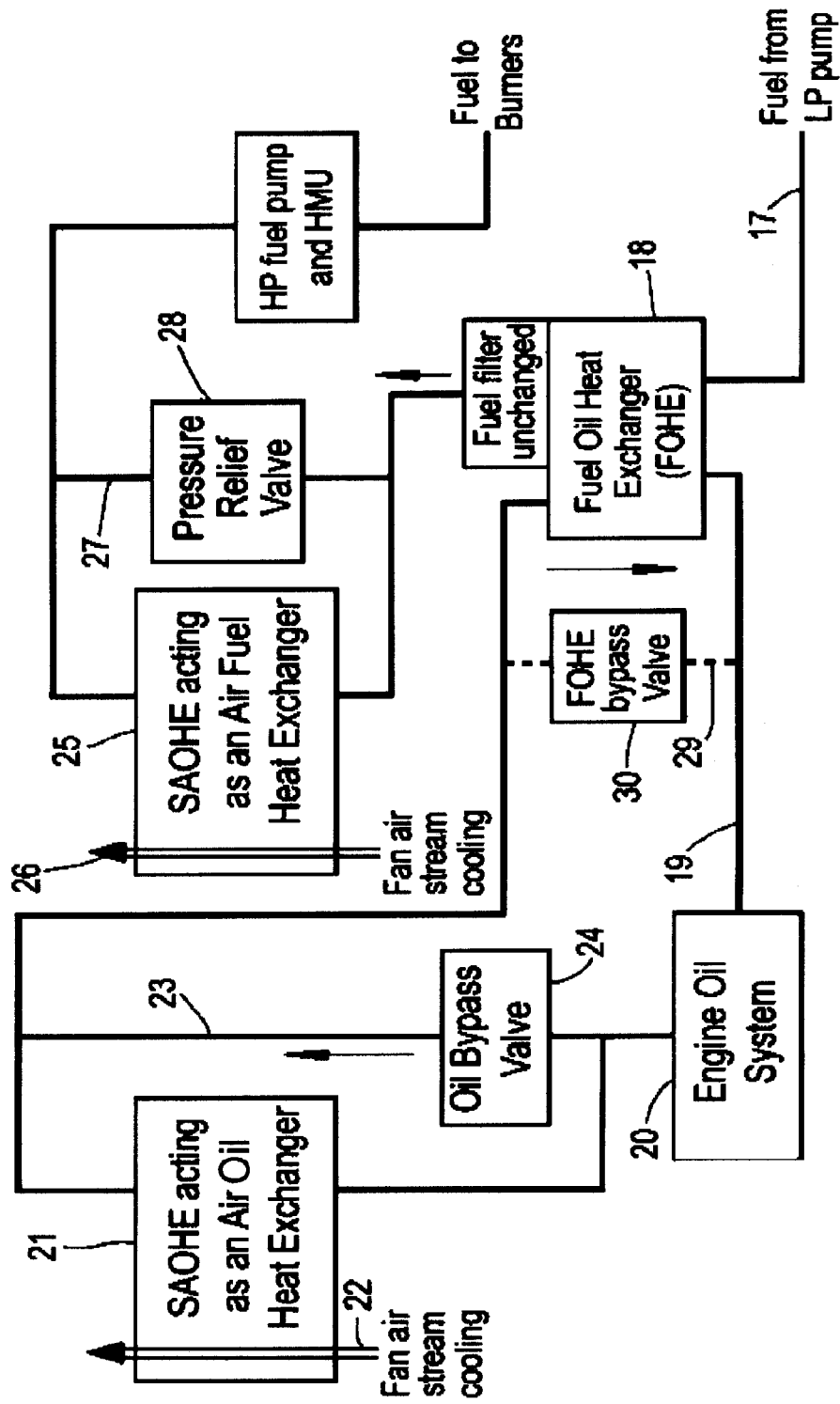

FIG. 4 shows schematically a fuel heat management system having a fuel/oil heat exchanger for exchanging heat between a fuel system and an oil system, and having an air/fuel heat exchanger in the fuel system and an air/oil heat exchanger in the oil system; and FIG. 5 shows schematically a plot of the predicted temperature variation of fuel exiting the fuel heat management system of FIG. 4 during the transition from a cruising phase of the engine to an idle descent phase of the engine.

Figure 1:
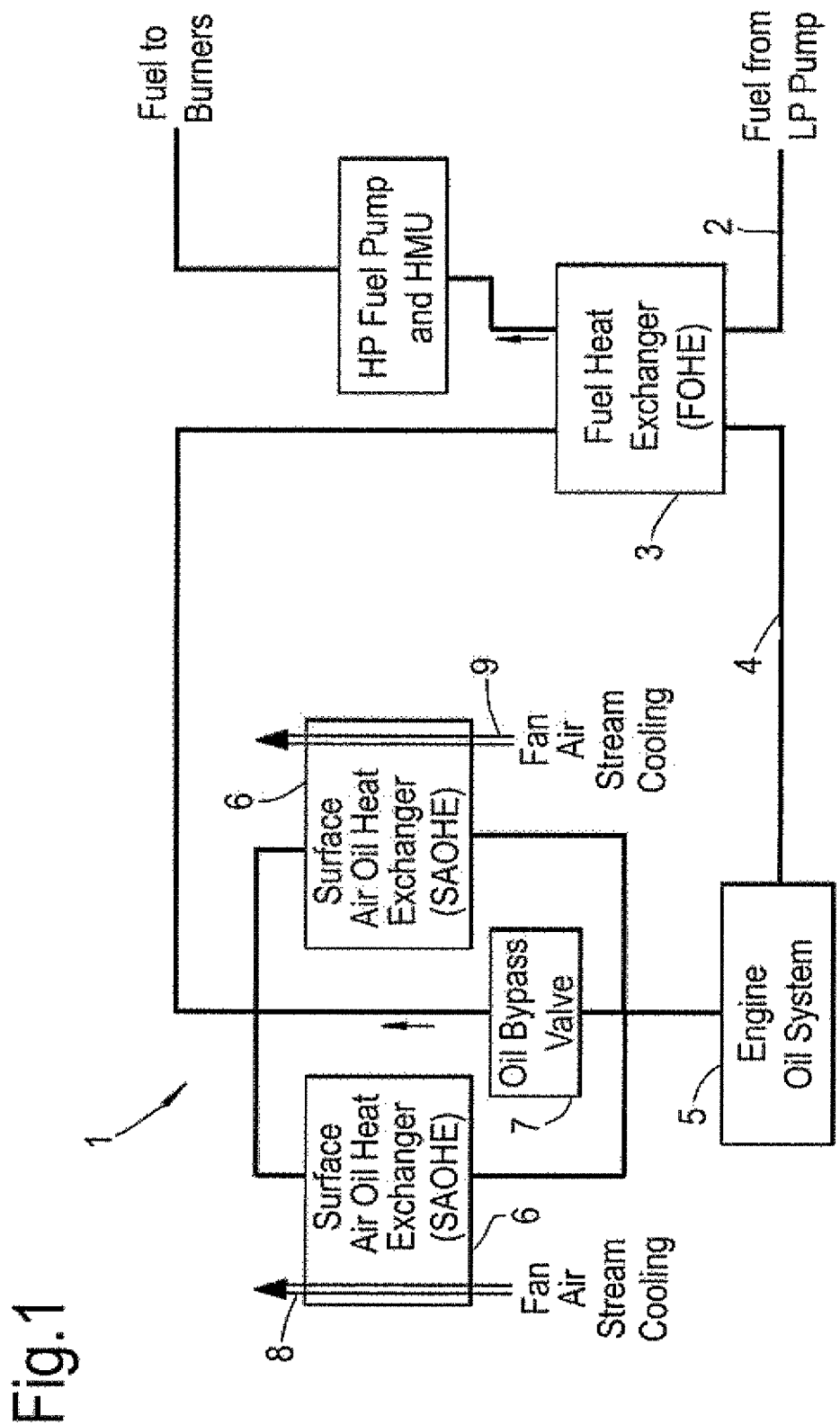
FIG. 1 shows schematically a conventional configuration of a fuel heat management system which has a fuel/oil heat exchanger for exchanging heat between a fuel system and an oil system and two surface air/oil heat exchangers for exchanging heat between the oil system and air.

FIG. 3 is a schematic plot showing the transient fuel temperature rise 10 predicted at the end of a cruise phase of an aircraft flight cycle, when the conventional fuel heat management system shown schematically in FIG. 1 is used in an engine with a lean burn combustion system. The predicted temperature variation is identical to that shown in the schematic plot of FIG. 2. However, superimposed relative to FIG. 2 is a maximum allowable fuel temperature of 101 degrees centigrade during the idle descent phase of the engine. This temperature limit arises because the fuel flow in the fuel line 2 has to act as a coolant for stagnant mains pockets of fuel in a staging valve of the engine. With the conventional heat management system shown schematically in FIG. 1, the predicted fuel temperature during the idle, low fuel flow-rate phase of the engine is above this maximum allowable temperature for the whole of the descent phase.

In order to fulfil the fuel temperature requirements of the lean burn combustion system during the idle phase of the engine, the conventional heat management system would have to lower the whole of the characteristic temperature curve shown in FIG. 3 by approximately 10 degrees centigrade. This may require an unrealistic increase in the size of the air/oil heat exchangers.

FIG. 4 shows schematically a fuel heat management system 16 according to the present invention which controls the temperature of fuel in a fuel line 17 connecting a low pressure pump to engine burners of an engine. A fuel/oil heat exchanger 18 receives fuel flowing through the fuel line. An oil line 19 circulates oil from an engine oil system 20 to the fuel/oil heat exchanger and back to the engine oil system, such that the fuel/oil heat exchanger brings the oil system and the fuel line into heat exchange relationship. The fuel/oil heat exchanger enables the hot engine oil to be used as a heating system for the colder fuel, the temperature of which may initially be below the freezing point of water. This prevents ice from forming in the fuel line and from subsequently blocking a fuel filter of the engine.

A surface air/oil heat exchanger 21 receives oil flowing through the oil line 19 and brings the oil and an air flow 22 into heat exchange relationship. Thus, heat dissipates from the oil system 20 into the air flow, lowering the oil temperature. A bypass oil line 23 having an oil bypass valve 24 can cause oil flowing through the oil line to bypass the air/oil heat exchanger when it is not necessary to limit the amount of oil heat transferred to the fuel line.

The surface air/oil heat exchanger 21 is located upstream on the oil line 19 from the fuel/oil heat exchanger 18. Thus, when it is desirable to reduce the flow of oil heat to the fuel line 17 through the fuel/oil heat exchanger, the oil can be cooled directly upstream of the fuel/oil heat exchanger.

An air/fuel heat exchanger 25 receives fuel flowing through the fuel line 17 and brings the fuel and an air flow 26 into heat exchange relationship. Thus, heat is dissipated from the fuel directly to the air flow. The air flow may be a stream of fan air passing through an air flow passage of a gas turbine engine, for example a fan bypass duct of a turbofan gas turbine engine. At a low fuel flow-rate, the air/fuel heat exchanger significantly reduces the temperature of the fuel. This temperature reduction counteracts any transient increase in the fuel temperature at the fuel/oil heat exchanger 18 caused by the thermal inertia of the oil. In this way, a hot fuel "slug" can be prevented from passing through the air/fuel heat exchanger. When the fuel flow-rate is higher, the temperature drop of the fuel across the air/fuel heat exchanger is less significant.

The air/fuel heat exchanger 25 is located downstream on the fuel line 17 from the fuel/oil heat exchanger 18. The air/fuel heat exchanger cools the fuel directly as it leaves the fuel/oil heat exchanger, preventing any transient temperature rise at the fuel/oil heat exchanger from reaching temperature sensitive components downstream of the air/fuel heat exchanger.

A bypass fuel line 27 having a pressure relief valve 28 can cause fuel flowing through the fuel line 17 to bypass the air/fuel heat exchanger 25. This safety mechanism allows fuel to pass to the engine if the air/fuel heat exchanger congeals or blocks with debris. The pressure relief valve crack-open pressure can also be matched to the normal pressure drop in the air/fuel heat exchanger, such that the fuel flow through the air/fuel heat exchanger may be restricted to the low fuel flow rates associated with the primary duty of the air/fuel heat exchanger. In this way, the fuel passage flow area through the air/fuel heat exchanger can be optimised, which in turn allows the size and weight of the air/fuel heat exchanger to be optimised.

Optionally, a further bypass oil line 29 having a further oil bypass valve 30 can cause oil flowing through the oil line 19 to bypass the fuel/oil heat exchanger 18 to further reduce heat transfer from oil to fuel if needed. However, use of the further bypass oil line can result in an increase in oil temperature.

FIG. 5 is a schematic plot showing that when the fuel heat management system of FIG. 4 is used in an engine with a lean burn combustion system, during the transition period between a cruise phase of the engine and an idle phase of the engine, the temperature of the fuel reaching the engine burners is significantly reduced when the engine becomes idle. On the other hand, during the cruise phase of the engine, the fuel temperature is maintained at a constant value of 109 degrees centigrade, below the maximum allowable temperature of 110 degrees centigrade in the engine fuel system during the cruise phase of the engine. Thus, the fuel heat management system reduces the fuel temperature only during the idle phase.

When the engine becomes idle, and the fuel flow-rate significantly reduces, the fuel temperature falls rapidly to a value of 96 degrees centigrade, below the maximum fuel temperature of 101 degrees centigrade allowed with lean burn hardware during the idle phase of the engine. The significant drop in the temperature of the fuel at the start of the idle phase of the engine, and the removal of the transient fuel temperature rise 10 observed in the schematic plots of FIGS. 2 and 3, is due to the effectiveness of the air/fuel heat exchanger 25 at cooling the fuel when the fuel flow-rate is low.

Specific temperatures quoted in the above figures are to illustrate the principle of the invention. These values will be different for different embodiments and applications.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A fuel heat management system comprising:
a fuel line for conveying fuel to engine burners of a gas turbine engine,
a fuel/oil heat exchanger which receives fuel flowing through the fuel line,
an oil line for circulating oil from an engine oil system to the fuel/oil heat exchanger and back to the engine oil system, such that the fuel/oil heat exchanger brings the oil and the fuel into heat exchange relationship, and
an air/oil heat exchanger which receives oil flowing through the oil line, the air/oil heat exchanger bringing the oil and air into heat exchange relationship,
wherein:
the fuel heat management system further comprises an air/fuel heat exchanger which receives fuel flowing through the fuel line, the air/fuel heat exchanger bringing the fuel and air into heat exchange relationship to reduce a temperature of the fuel,
the air/fuel heat exchanger is downstream on the fuel line from the fuel/oil heat exchanger, and
the fuel/oil heat exchanger brings the oil and the fuel into heat exchange relationship to increase the temperature of the fuel.

2. The fuel heat management system of claim 1 wherein the air/fuel heat exchanger is a single heat exchanger that receives fuel flowing through the fuel line, and the air/oil heat exchanger is a single heat exchanger that receives oil flowing through the oil line.

3. The fuel heat management system of claim 1 wherein a bypass fuel line having a pressure relief valve can cause fuel flowing through the fuel line to bypass the air/fuel heat exchanger.

4. The fuel heat management system of claim 1 wherein a bypass oil line having an oil bypass valve can cause oil flowing through the oil line to bypass the air/oil heat exchanger.

5. The fuel heat management system of claim 1 wherein the air/oil heat exchanger is upstream on the oil line from the fuel/oil heat exchanger.

6. The fuel heat management system of claim 1 wherein the air/fuel heat exchanger is located in an air flow passage of the gas turbine engine, wherein heat from the fuel is dissipated at the air/fuel heat exchanger into air flow through the passage.

7. The fuel heat management system of claim 1 wherein the air/oil heat exchanger is located in an air flow passage of the gas turbine engine, wherein heat from the oil is dissipated at the air/oil heat exchanger into air flow through the passage.

8. The fuel heat management system of claim 6 wherein the gas turbine engine is a turbofan gas turbine engine and the air flow passage is a fan bypass duct of the turbofan gas turbine engine.

9. A method of operating the gas turbine engine according to claim 1, the method comprising:
 running the engine at a cruise operating condition, and changing the engine to an idle operating condition;
 wherein, on changing from the cruise operating condition to the idle operating condition, the temperature of the fuel exiting the fuel heat management system along the fuel line decreases to a lower level.

10. The method of claim 9, wherein, on changing from the cruise operating condition to the idle operating condition, the temperature of the fuel exiting the fuel heat management system along the fuel line decreases to a lower level without any transient increase in temperature.

\* \* \* \* \*